(12) United States Patent
Huelke et al.

(10) Patent No.: US 9,193,298 B2
(45) Date of Patent: Nov. 24, 2015

(54) VEHICLE SUN VISOR WITH ILLUMINATION POWERED BY KINETIC MOTION

(71) Applicant: Ford Global Technologies, LLC, Dearborn, MI (US)

(72) Inventors: David R. Huelke, Milan, MI (US); Adam W. Hellar, Flatrock, MI (US); Matthew Majkowski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 248 days.

(21) Appl. No.: 14/048,700

(22) Filed: Oct. 8, 2013

(65) Prior Publication Data

US 2015/0097483 A1 Apr. 9, 2015

(51) Int. Cl.
*B60Q 1/26* (2006.01)
*B60Q 3/02* (2006.01)

(52) U.S. Cl.
CPC ............ *B60Q 3/0226* (2013.01); *B60Q 3/0293* (2013.01)

(58) Field of Classification Search
USPC ...................................................... 315/76–84
See application file for complete search history.

(56) References Cited

U.S. PATENT DOCUMENTS

| 5,098,150 | A  | * | 3/1992  | Smith et al. ................... 296/97.2 |
| 6,499,868 | B1 | * | 12/2002 | Kerul, Jr. ....................... 362/492 |
| 7,534,018 | B2 | * | 5/2009  | Nicola et al. ................... 362/492 |
| 2006/0181893 | A1 |   | 8/2006  | Fernandez et al. |
| 2010/0225248 | A1 | * | 9/2010  | Cruickshank et al. ........ 315/297 |
| 2011/0227361 | A1 |   | 9/2011  | Dai |
| 2012/0286675 | A1 |   | 11/2012 | Carmen et al. |
| 2014/0265841 | A1 | * | 9/2014  | Baek ............................... 315/77 |

FOREIGN PATENT DOCUMENTS

EP 1413037 B1 7/2006
WO 2012020254 A1 2/2012

OTHER PUBLICATIONS

Bell Automotive Products, Inc., Lighted Visor Mirror, Web page, 2013, 1 page.

* cited by examiner

*Primary Examiner* — Brandon S Cole
(74) *Attorney, Agent, or Firm* — Vichit Chea; Price Heneveld LLP

(57) ABSTRACT

A vehicle sun visor system and method for powering the vehicle sun visor are provided herein, and include a generator configured to produce a first current via kinetic motion. A converter is electrically coupled to the generator and configured to convert the first current into a second current. An energy storing device is electrically coupled to the converter and configured to store an electrical charge. An illumination source is electrically coupled to the energy storing device and configured to operate between an ON and an OFF state, wherein during the ON state, the electrical charge stored in the energy storing device is discharged to supply electrical power to the illumination source.

20 Claims, 3 Drawing Sheets

US 9,193,298 B2

VEHICLE SUN VISOR WITH ILLUMINATION POWERED BY KINETIC MOTION

FIELD OF THE INVENTION

The present invention generally relates to vehicle sun visor assemblies, and more specifically to a vehicle sun visor having an illumination source and a method for powering the same.

BACKGROUND OF THE INVENTION

Current vehicle visors rely on a vehicle power source to power illumination sources on the visor. The power is typically supplied by wires extending from the vehicle's instrument panel and up to the visor. This type of wire connection is often performed manually and requires additional parts such as wire harnesses. As a result, the cost and labor associated with including these visors may be increased. Thus, there is a need for a less prohibitive alternative.

SUMMARY OF THE INVENTION

According to one aspect of the present invention, a vehicle sun visor is provided, and includes a generator configured to produce a first current via kinetic motion. A converter is electrically coupled to the generator and configured to convert the first current into a second current. An energy storing device is electrically coupled to the converter and configured to store an electrical charge. An illumination source is electrically coupled to the energy storing device and configured to operate between an ON and an OFF state, wherein during the ON state, the electrical charge stored in the energy storing device is discharged to supply electrical power to the illumination source.

According to another aspect of the present invention, a vehicle sun visor is provided, and includes a magnet configured to energize a wire via kinetic motion, a visor body having an illumination source and configured to support translational movement of the magnet, and an energy storage device for storing an electrical charge produced by the energized wire, wherein discharging of the energy storage device powers the illumination source.

According to another aspect of the present invention, a method for powering an illumination source of a vehicle sun visor is provided, and includes the steps of providing a magnet and a wire, energizing the wire via translational movement of the magnet, charging an energy storing device by virtue of the energized wire, and discharging the energy storing device to power the illumination source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
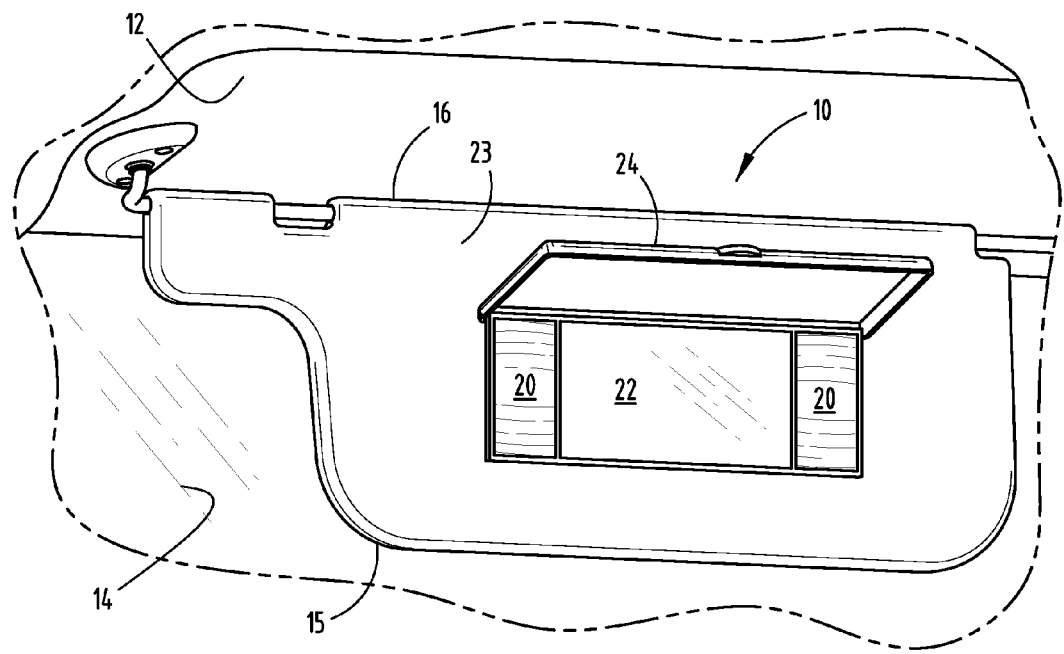
FIG. 1 is a perspective view from inside a vehicle, in which a vehicle sun visor is generally shown.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Reference will now be made in detail to the present embodiments, examples of which are illustrated in the accompanying drawings. Wherever possible, the same reference numerals will be used throughout the drawings to refer to the same or like parts. In the drawings, the depicted structural elements are not to scale and certain components are enlarged relative to other components for purposes of emphasis and understanding.

Figure 2:
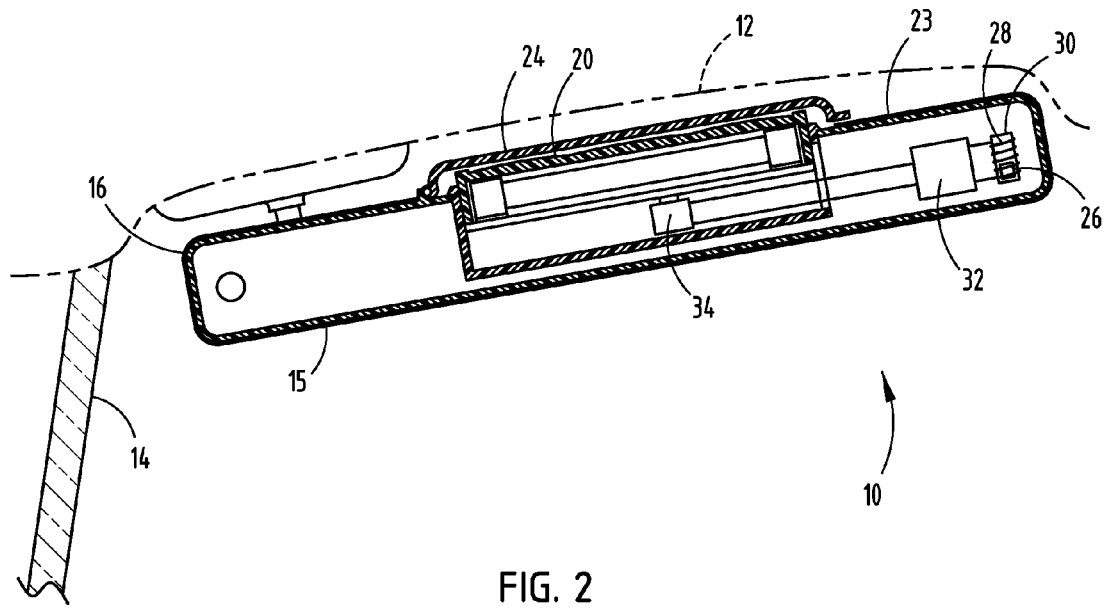
FIG. 2 is a side schematic view of one embodiment of a vehicle sun visor, in which the vehicle sun visor is exemplarily shown in a passive position.
Figure 3:
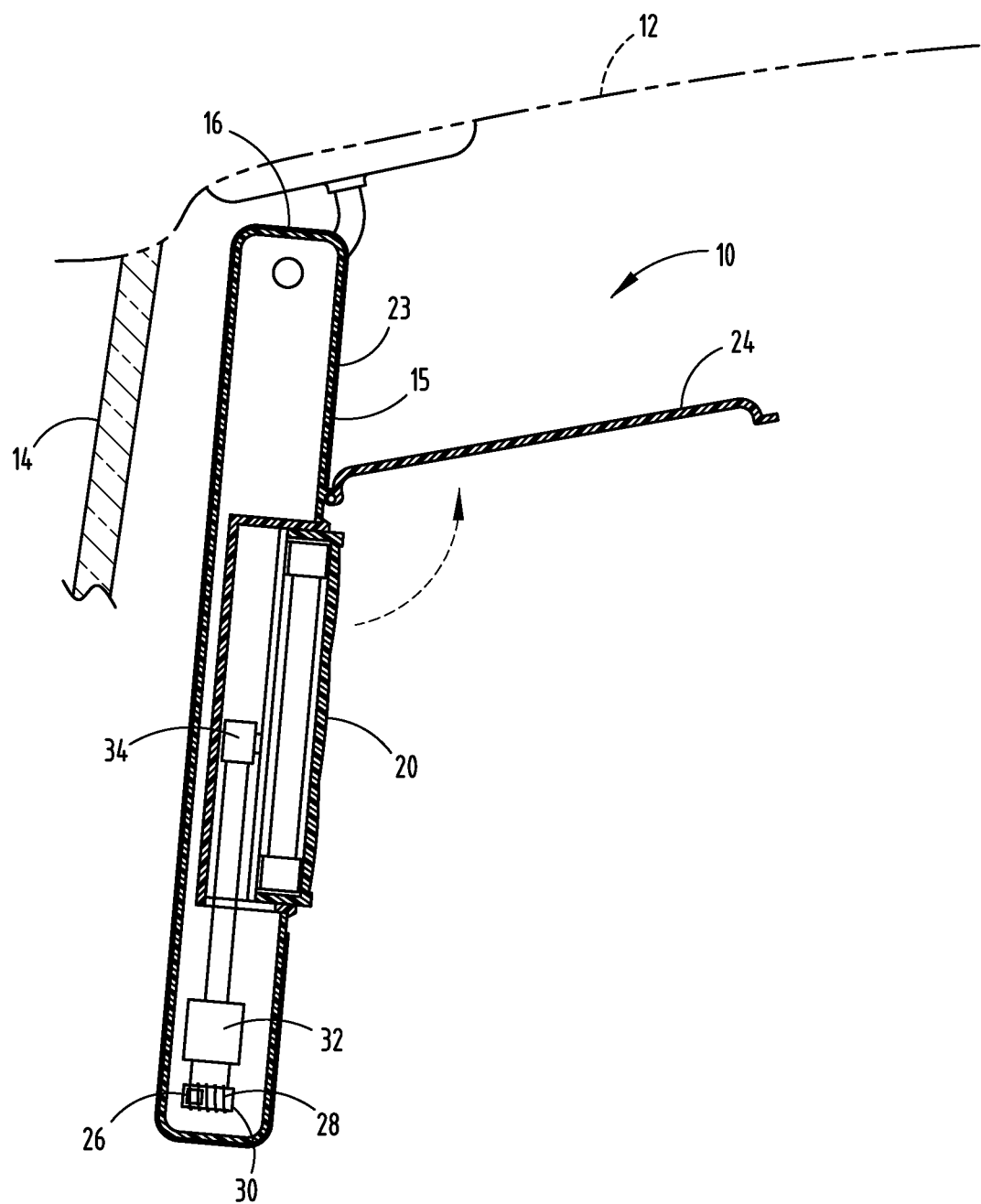
FIG. 3 is another side schematic view of the vehicle sun visor of FIG. 2, in which the vehicle sun visor is exemplarily shown in an active position.

Referring to FIGS. 1-3, reference numeral 10 generally designates a vehicle sun visor (hereinafter visor) conventionally positioned on the underside of a vehicle roof panel 12 proximate a vehicle windshield 14. The visor 10 includes a visor body 15, which may be pivotally coupled to the vehicle roof panel 12 at a rear edge 16 such that it may be angularly displaced between a generally horizontal passive position shown in FIG. 2 and a generally vertical variable active position shown in FIG. 3. In the passive position, the visor 10 is positioned to not interfere with light entry into the vehicle cabin through the windshield. To that end, the visor 10 may be suspended in a horizontal or substantially horizontal position and may at least partially abut against the vehicle roof panel 12. Alternatively, the visor 10 may be lowered to the active position to block light from entering the vehicle cabin and possibly impairing the view of a vehicle occupant such as a driver or passenger. The active position may include any angular position between the passive position and a maximum angular position in which the visor 10 at least partially abuts against the vehicle windshield 14. The visor 10 may also be lowered and turned to face a vehicle side window to lessen light entry therefrom.

Referring again to FIGS. 1-3, the visor body 15 includes vanity lighting having at least one illumination source 20 proximate a vanity mirror 22 disposed on a front side 23 of the visor body 15, which will face a vehicle occupant when the visor 10 is positioned in a selected active position. The illumination source 20 may include one or more light emitting diodes (LEDs) and may be actuated via a variety of control mechanisms such as, but not limited to, mechanical switches, discreet switches, timers, computing devices, light sensors, etc. The vanity mirror 22 and illumination source 20 may be positioned anywhere on the front side 23 of the visor body 15 but are typically positioned in a central location. A cover 24 may be provided to cover the illumination source 20 and/or the vanity mirror 22. The cover 24 may be arranged in any known configuration such as the flip up configuration shown in the illustrated embodiment, or a sliding configuration, and may be configured such that the illumination source 20 is turned ON when the cover 24 is either flipped up or slid open to expose the vanity mirror 22 and turned OFF when the cover 24 is either flipped down or slid closed to cover the illumination source 20 and/or vanity mirror 22. Alternatively, the illumination source 20 may be turned ON/OFF via other means such as a button, switch, or the like. In addition, the visor body 15 may be configured to accommodate other features such as a liquid crystal display (LCD) screen or a wallet for holding compact disks (CDs), papers, and other miscellaneous items. These features may be provided on the front side 23 or elsewhere on the visor body 15.

As shown in FIGS. 2 and 3, the visor body 15 is configured to support kinetic motion of a magnet 26 through a wire 28 having a coiled configuration. The magnet 26 may be disposed inside a sleeve 30 mounted to the interior of the visor body 15. In the illustrated embodiment, the magnet 26, wire 28, and sleeve 30 are exemplarily shown located in an outer region of the visor body 15 so as not to encumber the central region of the visor body 15 typically used to house other features such as, but not limited to, the illumination source 20 and/or the vanity mirror 22. The sleeve 30 is oriented such that kinetic motion of the magnet 26 occurs through translational movement in a vertical or substantially vertical direction when the visor body 15 is in the passive position. For translational movement of the magnet 26 to occur, operation of a motorized vehicle is required. For example, when the visor body 15 is in the passive position, disturbances such as road bumps and/or uneven roads may launch the magnet 26 upwards from a rest position within the sleeve 30 such that the magnet 26 passes through the wire 28 a first time before gravitational forces cause the magnet 26 to return to the rest position while passing through the wire 28 a second time.

Alternatively, when the visor body 15 is positioned in an active position, such as that shown in FIG. 3, translational movement of the magnet 26 generally occurs in a horizontal or substantially horizontal direction such that changes in vehicle speed may cause the magnet to pass through the wire 28. It should be appreciated that other orientations are possible for the sleeve 30. For example, in one embodiment, the sleeve 30 and the wire 28 may be oriented such that translational movement of the magnet 26 through the wire 28 occurs horizontally or substantially horizontally when the visor body 15 is in the passive position. In another embodiment, the sleeve 30 and wire 28 may be oriented such that translational movement of the magnet 26 through the wire 28 occurs in and out of the page with respect to FIGS. 2 and 3. The aforementioned orientations are just a few possible orientations for the sleeve 30 and the wire 28. Those having ordinary skill in the art should readily recognize that the sleeve 30 and the wire 28 might be oriented in a variety of positions within the visor body 15 to produce varying translational movement of the magnet 26. Also, it is contemplated that the sleeve 30 may take on non-linear configurations such that the magnet 26 is not limited to translational movement. Further, while the illustrated embodiment is shown and described herein as having a single magnet 26 and wire 28, it should be appreciated that alternative embodiments may employ more than one magnet and/or wire without departing from the teachings provided herein.

With respect to the illustrated embodiment shown in FIGS. 2 and 3, each pass of the magnet 26 through the wire 28 energizes the wire 28 by virtue of the magnetic field of the magnet 26. As a result, an alternating (AC) current is induced on the wire 28. To bolster efficiency, a magnet 26 having a high flux density per unit volume may be used. Also, by increasing the number of coil turns for a chosen wire, a greater amount of current may be generated thereon. Further, by increasing the diameter of the coils, a larger magnet with greater field strength may be used.

A converter 32 converts the AC current into direct (DC) current, which is used to electrically charge an energy storing device 34. When the energy storing device 34 has been sufficiently charged, it may be used to power the illumination source 20. While the illumination source 20 is in use, the energy storing device 34 will discharge. Nevertheless, energization of the wire 28 may still occur when the illumination source 20 is ON such that additional electrical charge is provided to the energy storing device 34 to extend the ON time of the illumination source 20. If the energy storing device 34 has been depleted of electrical charge or the illumination source 20 is turned OFF, subsequent energization of the wire 28 will aid in replenishing the energy storing device 34 so that the illumination source 20 may be powered at a later time.

Figure 4:
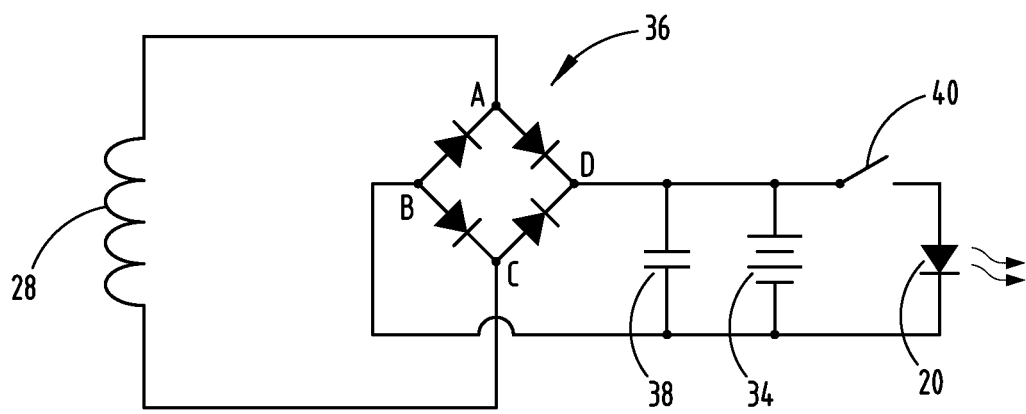
FIG. 4 is a circuit schematic for a self-charging circuit used to power an illumination source of the vehicle sun visor according to one embodiment.
Figure 5:
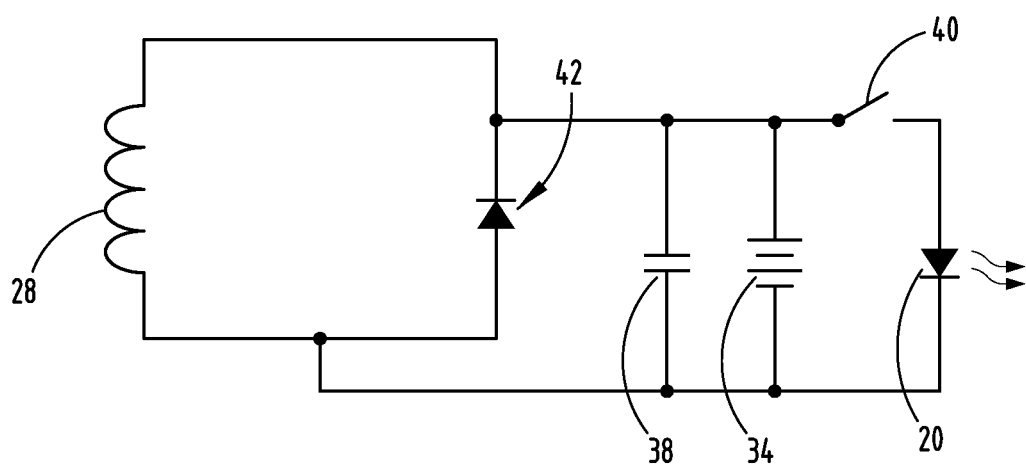
FIG. 5 is another circuit schematic for a self-charging circuit used to power the illumination source of the vehicle sun visor according to another embodiment.

Referring to FIG. 4, a circuit schematic for a self-charging circuit used to power the illumination source 20 is shown. In the illustrated circuit, the wire 28 is connected to the converter 32, which is shown as a full wave bridge rectifier 36 (hereinafter rectifier), which may be embodied using Schottky diodes. The wire 28 connects to the rectifier 36 at nodes A and C. Since the wire 28 is energized periodically, AC current from the wire 28 is rectified and outputted discontinuously from the rectifier 36 as DC current. A capacitor 38 may be connected in parallel to the rectifier 36 at nodes B and D to smooth the rectified output current before it proceeds to charge the energy storing device 34. The energy storing device 34 may include a rechargeable battery (as shown), a capacitor, or other devices capable of storing electrical charge. The energy storing device 34 is connected in parallel to the capacitor 38 and connected in parallel to a series combination that includes a switch 40 and the illumination source 20. Thus, while the switch 40 is open, the illumination source 20 is in an OFF state and the energization of the wire 28 may charge the energy storing device 34. Conversely, when the switch 40 is closed, the illumination source 20 is in an ON state and the energy storing device 34 may be discharged to supply power to the illumination source 20. While the illustrated embodiment has been shown implemented with a full wave bridge rectifier 36, it should be understood that other rectifiers might be similarly implemented. For example, a circuit schematic employing a half wave bridge rectifier 42 as shown in FIG. 5 may be employed.

Accordingly, a visor 10 for use in a vehicle has been advantageously provided herein. The visor 10 benefits from vehicle motion to generate electrical energy, which may be used to power illumination sources on the visor. As a result, the visor 10 is free from making any electrical connections with the vehicle, which enables it to be easily assembled inside the vehicle.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise

What is claimed is:

1. A vehicle sun visor comprising:
   a generator configured to produce a first current via kinetic motion;
   a converter electrically coupled to the generator and configured to convert the first current into a second current;
   an energy storing device electrically coupled to the converter and configured to store an electrical charge; and
   an illumination source electrically coupled to the energy storing device and configured to operate between an ON and an OFF state, wherein during the ON state, the electrical charge stored in the energy storing device is discharged to supply electrical power to the illumination source.

2. The vehicle sun visor of claim 1, wherein the generator comprises a wire and a magnet having a magnetic field, wherein translational movement of the magnet through the wire energizes the wire by virtue of the magnetic field of the magnet.

3. The vehicle sun visor of claim 2, wherein the generator is provided in a visor body that moves between a first position and a second position such that translational movement of the magnet occurs in a substantially vertical direction when the visor body is positioned in one of the first position and the second position.

4. The vehicle sun visor of claim 1, wherein the converter comprises one of a full wave bridge rectifier and a half wave bridge rectifier.

5. The vehicle sun visor of claim 4, wherein the first current is an alternating current (AC) and the second current is a direct current (DC).

6. The vehicle sun visor of claim 5, further comprising a first capacitor for smoothing the DC current.

7. The vehicle sun visor of claim 6, wherein the rectifier, the first capacitor, and the energy storage device are connected in parallel.

8. The vehicle sun visor of claim 7, wherein the energy storing device comprises one of a rechargeable battery and a second capacitor.

9. The vehicle sun visor of claim 8, wherein the illumination source comprises at least one light emitting diode (LED).

10. The vehicle sun visor of claim 9, further comprising a switch for turning the at least one light emitting diode between an ON state and an OFF state.

11. The vehicle sun visor of claim 10, wherein the energy storing device is connected in parallel to a series combination of the switch and the at least one light emitting diode.

12. A vehicle sun visor comprising:
    a magnet configured to energize a wire via kinetic motion;
    a visor body having an illumination source and configured to support kinetic motion of the magnet; and
    an energy storage device for storing an electrical charge produced by the energized wire;
    wherein discharging of the energy storage device powers the illumination source.

13. The vehicle sun visor of claim 12, wherein the visor body supports translational movement of the magnet through the wire.

14. The vehicle sun visor of claim 13, wherein the visor body moves between a first position and a second position such that translational movement of the magnet occurs in a substantially vertical direction when the visor body is positioned in one of the first position and the second position.

15. The vehicle sun visor of claim 12, wherein energization of the wire produces alternating current (AC).

16. The vehicle sun visor of claim 15, further comprising a rectifier for rectifying the AC current into direct current DC.

17. The vehicle sun visor of claim 16, further comprising a switch for turning the illumination source between an ON and an OFF state.

18. The vehicle sun visor of claim 17, further comprising a capacitor for smoothing the DC current.

19. The vehicle sun visor of claim 18, wherein the energy storing device is connected in parallel with the capacitor, the rectifier, and a series combination of the switch and the illumination source.

20. A method for powering an illumination source of a vehicle sun visor, comprising the steps of:
    providing a magnet and a wire;
    energizing the wire via translational movement of the magnet;
    charging an energy storing device by virtue of the energized wire; and
    discharging the energy storage device to power the illumination source.

* * * * *